United States Patent
Fry et al.

(10) Patent No.: US 10,497,374 B2
(45) Date of Patent: Dec. 3, 2019

(54) CONTACT PRIORITIZED COMMUNICATION FOR VOICE COMMANDS

(71) Applicants: BLACKBERRY LIMITED, Waterloo, Ontario (CA); QNX SOFTWARE SYSTEMS LIMITED, Kanata, Ontario (CA)

(72) Inventors: Darrin Kenneth John Fry, Kanata (CA); Jianqiang Shi, Nepean (CA); Stephen Lau, Malmö (SE)

(73) Assignees: BLACKBERRY LIMITED, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 14/646,513

(22) PCT Filed: Nov. 21, 2012

(86) PCT No.: PCT/CA2012/050835
§ 371 (c)(1),
(2) Date: May 21, 2015

(87) PCT Pub. No.: WO2014/078930
PCT Pub. Date: May 30, 2014

(65) Prior Publication Data
US 2015/0317978 A1 Nov. 5, 2015

(51) Int. Cl.
*G10L 21/00* (2013.01)
*G10L 17/22* (2013.01)

(52) U.S. Cl.
CPC .................... *G10L 17/22* (2013.01)

(58) Field of Classification Search
CPC ....... G10L 15/22; G10L 15/08; G10L 15/183; G10L 15/197; G10L 15/26; G10L 2015/088; G10L 2015/223
See application file for complete search history.

(56) References Cited

U.S. PATENT DOCUMENTS 6,650,739 B1    11/2003   Doeberl et al.
2002/0159572 A1 10/2002   Fostick
(Continued)

FOREIGN PATENT DOCUMENTS

EP         1686773       8/2006

OTHER PUBLICATIONS

Webpage SMS4Life http://lifehacker.com/5506326/how-can-i-send-an-email-via-text-messag, Mar. 2, 2010 archive.*
(Continued)

*Primary Examiner* — Huyen X Vo
(74) *Attorney, Agent, or Firm* — Rowand LLP

(57) ABSTRACT

Methods and electronic devices for facilitating communication are described. In one example, the present application describes processor-implemented method. The method includes: receiving an audio signal; determining that the audio signal includes a voice command to communicate with a contact using a first communication type; and determining that communication with the contact using the first communication type is unavailable; and after determining that communication with the contact using the first communication type is unavailable, facilitating communication with the contact using a second communication type.

20 Claims, 5 Drawing Sheets

(56) References Cited

U.S. PATENT DOCUMENTS

| | | | | |
|---|---|---|---|---|
| 2004/0047303 | A1 | 3/2004 | Ferbnandez et al. | |
| 2004/0057561 | A1 | 3/2004 | Gilbert | |
| 2006/0031493 | A1* | 2/2006 | Cugi | H04L 67/06 709/225 |
| 2006/0053379 | A1* | 3/2006 | Henderson | G06F 3/0481 715/751 |
| 2006/0227725 | A1* | 10/2006 | Huotari | H04L 41/082 370/254 |
| 2008/0278740 | A1* | 11/2008 | Bird | G06Q 10/10 358/1.15 |
| 2009/0298474 | A1* | 12/2009 | George | G10L 13/00 455/412.2 |
| 2010/0159868 | A1* | 6/2010 | Seymour | G08B 25/004 455/404.1 |
| 2011/0223893 | A1* | 9/2011 | Lau | G10L 15/22 455/414.1 |
| 2011/0288868 | A1 | 11/2011 | Lloyd et al. | |

OTHER PUBLICATIONS http://lifehacker.com/5506326/how-can-i-send-an-email-via-text-messag, Apr. 2, 2010 archive.*
SMS4Life (http://lifehacker.com/5506326/how-can-i-send-an-email-via-text-messag, Apr. 2, 2010 archive).*
PCT, Written Opinion and International Search Report relating to PCT application No. PCT/CA2012/050835 dated Aug. 1, 2013.
EPO, Extended European Search Report relating to EP Application No. 1288838.5, dated Jun. 24, 2016.

* cited by examiner

CONTACT PRIORITIZED COMMUNICATION FOR VOICE COMMANDS

TECHNICAL FIELD

The present application relates to communications on electronic devices and, more particularly, to methods and devices for facilitating communications with a selected contact.

BACKGROUND

Communication devices, such as smartphones, are electronic devices that are configured for communications with other electronic devices. Such electronic devices are sometimes equipped with a voice control subsystem that allows a user of such electronic devices to issue voice commands to the electronic device.

On electronic devices having such voice control subsystems, when a voice command is issued and the electronic device is unable to complete the task associated with the voice command, an error may be generated; for example, the electronic device may inform the user that it is unable to perform the task.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one example embodiment, the present application describes processor-implemented method. The method includes: receiving an audio signal; determining that the audio signal includes a voice command to communicate with a contact using a first communication type; and determining that communication with the contact using the first communication type is unavailable; and after determining that communication with the contact using the first communication type is unavailable, facilitating communication with the contact using a second communication type.

In another example embodiment, the present application describes an electronic device. The electronic device includes a microphone for generating an audio signal and one or more communication subsystems for communicating with other electronic devices using a first communication type and a second communication type. The electronic device also includes a processor. The processor is configured to: receive an audio signal; determine that the audio signal includes a voice command to communicate with a contact using a first communication type; and determine that communication with the contact using the first communication type is unavailable; and after determining that communication with the contact using the first communication type is unavailable, facilitate communication with the contact using a second communication type.

In yet another example, the present application describes a processor-implemented method. The method includes: receiving an audio signal including a voice command instructing that specified content be transmitted according to a first communication type; determining that communication using the first communication type is currently unavailable based on a current network connectivity status; and after determining that communication using the first communication type is currently unavailable, including the specified content in a communication associated with a second communication type.

Other example embodiments of the present disclosure will be apparent to those of ordinary skill in the art from a review of the following detailed description in conjunction with the drawings.

Example embodiments of the present disclosure are not limited to any particular operating system, electronic device architecture or computer programming language.

Example Electronic Device

Figure 1:
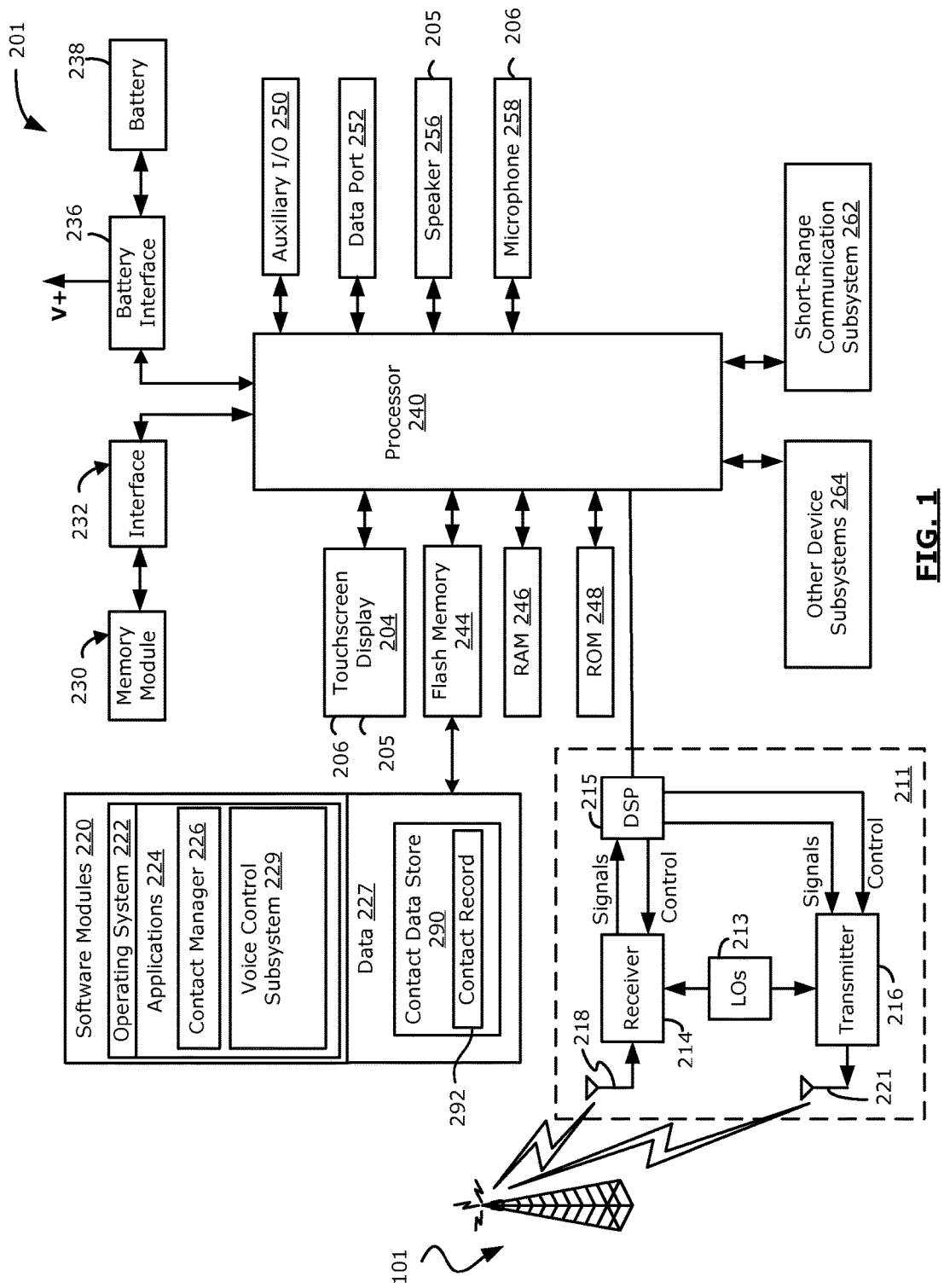
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the electronic device 201 may be of a type not specifically listed above.

The electronic device 201 includes a housing (not shown), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display 204), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as the touchscreen display 204, one or more speakers 256, or other output interfaces 205), a short-range communication subsystem 262, and other device subsystems generally designated as 264. Some of the subsystems shown in FIG. 1 perform communication-related functions, whereas other subsystems may provide "resident" or on-device functions.

In the example illustrated, the electronic device 201 includes a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205. It will be appreciated that, in other example embodiments, the electronic device 201 may include a display that is not a touchscreen display (i.e. it may include a display capable of output but not input).

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (touch feedback).

In some example embodiments, the electronic device 201 also includes a removable memory module 230 (which may include flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records 292, and task items may be stored in individual databases within the memory of the electronic device 201. By way of example, contact records 292 may be stored in a contact data store 290 which may be a database which is configured for storing the contact records.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes and/or is connectable to a power source, such as a battery 238. The battery 238 may be one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications will normally be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input devices, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222, and other software applications 224, such as a contact manager 226 and/or a voice control subsystem 229. In the example embodiment of FIG. 1, the contact manager 226 and the voice control subsystem 229 are implemented as separate stand-alone applications 224, but in other example embodiments, the contact manager 226 and/or the voice control subsystem 290 may be implemented as part of the operating system 222 or another application 224.

The electronic device 201 may include a range of additional software applications 224, including, for example, a notepad application, a voice communication (i.e. telephony) application, a mapping application, or a media player application, or any combination thereof. Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function. In at least some example embodiments, the software applications 224 may include pre-determined voice command information associating functions with voice commands that may be issued to the voice control subsystem 229.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The contact manager 226 performs the functions of an address book and allows contact records 292 to be created and stored in memory. For example, the contact manager 226 may permit contact records 292 to be stored in a contact data store 290 in the data area of memory.

Contact records 292 are records which store contact information for a contact. The contact may, for example, be a person or business associated with a user of the electronic device 201. A contact record 292 may include identifying information for a contact, such as a name of the contact. The contact record 292 may also include contact information for communicating with the contact. The contact information may be unique identification information that may be used for directing a communication to the contact. For example, the contact information may be an address (such as an electronic messaging address) or phone number that may be used for communicating with the contact. By way of example any one or combination of the following types of contact information may be included in a contact record: one or more phone numbers (which may be used for voice communication and/or text messaging such as short messaging service (SMS) messaging or multimedia messaging service (MMS) messaging), one or more email addresses (which may be used for sending email messages to the contact), one or more instant messaging addresses (which may be used for sending instant messages to the contact via an instant messaging service, such as Blackberry™ Messenger (BBM™), Yahoo™ messenger, Google™ chat, or another instant messaging service), one or more device-to-device messaging addresses (which may, for example, be a unique personal identification number (PIN) associated with an electronic device that may be used for sending direct messages, which may be referred to as PIN messages, to the device), one or more social networking addresses (which may be used for sending a message or other type of communication to a user of a social networking service such as Facebook™, Google+™, Twitter™, etc.). Other types of contact information may be included apart from those types specifically discussed herein. In some example embodiments, contact records 292 may include different types of contact information.

Thus, contact records 292 may be configured to allow contact information associated with a plurality of communication types to be stored. For example, contact information associated with a first communication type may be stored in some contact records 292 and contact information associated with a second communication type may be stored in some contact records 292. The electronic device 201 may be configured to utilize this contact information to communicate with the contact using these communication types. For example, the contact information stored in a contact record may be contact information associated with any one or combination of the following communication types: email messaging, telephony, text messaging including SMS messaging and/or MMS messaging, instant messaging, PIN messaging, social network messaging and/or video chat.

While a single contact record 292 is illustrated in FIG. 1, the electronic device 201 may access a plurality of contact records 292 associated with a plurality of contacts. For example, in at least some example embodiments, the contact data store 290 may store a plurality of contact records 292, each associated with a separate contact. FIG. 1 illustrates an example embodiment in which the contact records 292 are stored locally in memory on the electronic device. In other example embodiments, the electronic device 201 may access contact records 292 stored on other devices, servers or systems. For example, in at least some example embodiments, the electronic device 201 may access one or more contact records 292 stored in a cloud environment (e.g. in a server accessible over a network).

In some example embodiments, the contact manager 226 may be used to manage contact records 292. For example, the contact manager 226 may be configured to receive new contact records 292 from one or more input interfaces 206 associated with the electronic device 201. For example, a user of the electronic device 201 may interact with an input interface 206 (for example, the touchscreen display 204) in order to input an instruction to the contact manager 226 to create a new contact record 292. Similarly, in at least some example embodiments, the contact manager 226 is configured to receive contact records 292 via the communication subsystem 211. For example, in some example embodiments, a contact record 292 may be received in an electronic message, such as an email. The contact manager 226 may store contact records 292 received via an input interface 206 or a communication subsystem 211 in the contact data store 290. Such storage may occur automatically or at the request of the user (e.g. by selecting an option to store a contact record 292 to memory such as a "save" option).

The contact manager 226 may be configured to permit contact records to be created in other ways apart from those mentioned above. For example, in some example embodiments, the contact manager 226 may allow one or more contact records 292 to be imported from another application and/or file.

In at least some example embodiments, after contact records 292 are created, they may be accessed by the contact manager 226. In at least some example embodiments, contact records 292 may be accessed by other applications 224. For example, in at least some example embodiments, some applications 224 may access the contact records 292 directly. In other example embodiments, the contact manager 226 may control access to the contact records 292. In at least some such example embodiments, other applications 224 may access the contact records 292 by requesting access from the contact manager 226. For example, in at least some example embodiments, the contact manager 226 may be equipped with an application programming interface (API) which allows other applications to request information associated with contact records 292. In response to receiving such requests via an API, the contact manager 226 may retrieve the requested information and provide the information to the requesting application.

The contact records 292 may be received and/or stored in vCard format or in another format which describes contact information.

As noted above, in at least some example embodiments, the electronic device 201 may include a voice control subsystem 229. The voice control subsystem is configured to receive one or more voice commands. More particularly, the voice control subsystem 229 may analyze a signal received from the microphone 258, may interpret that signal as one of a plurality of possible voice commands supported by the voice control subsystem 229. In at least some example embodiments, the voice control subsystem 229 includes a speech recognition engine. The speech recognition engine may convert the audio signal into text, which may be analyzed according to one or more predetermined rules to determine whether the audio signal contains a voice command and if so, the nature of that voice command.

The voice control subsystem 229 may, in some example embodiments, continuously monitor audio signals generated by the microphone 258 while the electronic device 201 is powered on. That is, the voice control subsystem 229 may, in at least some example embodiments, operate as a background process, analyzing audio signals generated by the microphone 258 without specific user-instruction to initiate the analysis. In other example embodiments, the voice control subsystem 229 may only monitor audio signals generated by the microphone 258 after receiving a specific instruction via an input interface 206 (such as a button or touchscreen display 204) instructing the electronic device 201 to initiate monitoring for a voice command. For example, a user may activate a voice control subsystem activation button (not shown) which causes the voice control subsystem 229 to begin analyzing the audio signal generated by the microphone 258 to determine whether the audio signal includes a voice command.

When the voice control subsystem 229 identifies a voice command represented by the audio signal, a function may be performed on the electronic device 201 based on the voice command identified.

In at least some example embodiments, the voice control subsystem 229 may be used to initiate communication with a contact. That is, a voice command may be issued to the voice control subsystem 229 (using the microphone 258) to instruct the electronic device 201 to initiate a communication with a contact. The instruction may indicate the specific communication type that is requested by the user for communicating with the contact. That is, the voice command may represent an instruction to communicate with a contact using a specific communication type (the requested communication type may be referred to as a first communication type).

For example, in at least some example embodiments, any one or more of the following words or phrases may be interpreted as an instruction to communicate with a contact using telephony communications: "call", "phone", "dial", "telephone", "talk to", "chat with", and/or "voice".

Similarly, any one or more of the following words or phrases may be interpreted as an instruction to communicate with a contact using a video chat service (such as Skype™): "Skype", "video chat", "video dial", "video call", and/or "video phone".

Similarly, any one or more of the following words or phrases may be interpreted as an instruction to communicate with a contact using an email message: "email", "electronic mail", "email message", and/or "message".

Similarly, any one or more of the following words or phrases may be interpreted as an instruction to communicate with a contact using text messaging service: "text", "SMS" (which may be interpreted as a command to send a short messaging service text message), "MMS" (which may be interpreted as a command to send a multimedia messaging service text message), and/or "text message".

Similarly, any one or more of the following words or phrases may be interpreted as an instruction to communicate with a contact using an instant messaging service: "chat", "chat with", "IM", "instant message", "BBM" or "Blackberry message" or "BB message" (which may be interpreted as an instruction to communicate via a Blackberry Messenger™ service), "Yahoo message" or "Yahoo chat" (which may be interpreted as an instruction to communicate using a Yahoo Messaging™ service, and/or "Google message" or "Google chat" (which may be interpreted as an instruction to communication via a Google Chat™ service).

Similarly, any one or more of the following words or phrases may be interpreted as an instruction to communicate using a device-to-device messaging service: "PIN", "device-to-device", "D2D", "device to device", "device message" and/or "PIN message."

Similarly, any one or more of the following words or phrases may be interpreted as an instruction to communicate using a social network: "Facebook™" or "Facebook message" or "Facebook post" (which may be interpreted as an instruction to communicate using Facebook™ e.g. by sending a Facebook message or by posting on a wall), "Google plus" or "Google plus message" (which may be interpreted as an instruction to communicate using Google™), "Tweet to" or "Twitter to" (which may be interpreted as an instruction to communicate using Twitter™).

It will be appreciated that other words or phrases may be interpreted as any of the instructions discussed above and that other types of communication types may be provided apart from those discussed above. For example, the methods described herein may be used with other messaging services not specifically identified above.

In addition to specifying the communication type, the voice command may specify a contact associated with the communication. That is, the voice command may include a communication recipient identifier, which identifies one or more specific contacts to whom the communication is to be made. For example, the voice command may include the name of a contact having a contact record 292 that is available to the electronic device (e.g. that is stored in memory). In at least some example embodiments, the voice control subsystem 229 is configured to monitor for a communication recipient identifier when an instruction to communicate is received. For example, when an instruction to communicate is received, the voice control subsystem 229 may then determine whether a contact has been specified. This determination may be made by comparing content of the voice command to content of one or more of the contact records 292. For example, words and phrases in the voice command (representing the content of the audio signal) may be compared with a name field of the contact records 292 to identify a contact record associated with the communication (and to identify a contact associated with the communication).

In some example embodiments, the voice command may specify the communication type and the contact associated with the communication in a single sentence (e.g. "Call Janet"). Accordingly, in at least some example embodiments, the voice command may be a continuous command that specifies a communication type and identifies a contact without an intervening prompt between these two types of information. For example, the voice command may specify a communication type before specifying the contact and, following the communication type, the electronic device may not prompt the user to input the contact information. In other example embodiments, the communication type and the contact may be separately specified. For example, a user may input a voice command specifying a communication type but not a contact and, in response, the electronic device may prompt the user to specify a contact. At this time, the electronic device may not limit the selection of contacts to the contacts having a contact record with contact information for communicating according to the specified communication type; a user may be permitted to specify any available contact (e.g. "You have requested that I compose an email. Please specify the recipient"). After the prompt, the user may issue a voice command identifying the contact.

Thus, in some example embodiments, the communication type specified in the voice command may not currently be available for communication with the specified contact. For example, in some circumstances, the contact record associated with the specified contact may not include contact information associated with the requested communication type. In at least some example embodiments, if it is determined that communication with the contact using the requested communication type (which may be referred to as a first communication type) is unavailable, then the electronic device may facilitate communication with the requested contact using another communication type (which may be referred to as a second communication type). This alternative communication type (i.e. the second communication type) is a communication type that is determined to be available. For example, if contact information associated with the specified communication type is not included in the contact record for the requested contact, then the electronic device may automatically facilitate communication using another communication type associated with contact information included in the contact record.

Accordingly, when a communication using a first communication type is requested for communicating with a specified contact and communication to that contact with the first communication type is unavailable, the electronic device 201 may initiate communicating with the contact using a second communication type without requiring the user to re-identify the contact. Thus, the contact is prioritized over the communication type.

Similarly, in some example embodiments, the electronic device 201 may be configured to facilitate communication using an alternative communication type when a requested communication type is unavailable based on a current network status. For example, the electronic device 201 may include a wireless communications subsystem 211 that allows the electronic device to communicate with wireless networks 101 of different types. Some of the types of networks may support both voice based communications (such as telephony and/or text messaging) and data based communications (such as email and communications requiring Internet-based services) and some of the types of networks may support only voice based communications (i.e. some networks may not provide a data connection) and some of the types of networks (such as Wi-Fi in some example embodiments) may only support data based communications (i.e. some networks may not support telephony or text messaging communications that rely on a telephony network). In some circumstances, a voice command may instruct the electronic device 201 to communicate with a contact using a communication type that is not supported by the available network types. That is, the requested communication type may be unavailable due to the current network connectivity status (i.e. since the available network(s) may not support that type of communication). In at least some example embodiments, when the electronic device determines that, based on the current network connectivity status, the requested communication type (which may be referred to as a first communication type) is not available, then it may automatically facilitate communication with the specified contact using another communication type that is available (i.e. that is supported by the available network(s)), which may be referred to as a second communication type.

Similarly, in some example embodiments, the electronic device 201 may be configured to facilitate communications using an alternative communication type (i.e. a communication type that differs from the communication type requested) when a requested communication type is unavailable due to a service outage. For example, some communication types may rely on one or more third-party services. For example, an online service may be used for some communication types to communicate. By way of example social network based communications, such as Facebook™, Google+™, or Twitter™ communications, may rely on online servers to send such communications. In some circumstances, these services may experience an outage; for example, a server associated with the service may go offline. In some example embodiments, when a user requests a communication type that relies on such an online service, the electronic device may determine whether the service is available. This determination may be performed, for example, by attempting to contact a server associated with the service. If the electronic device 201 is unable to contact the server, it may determine that the online service is not available. When this happens, the electronic device 201 may automatically facilitate communication with the specified contact using another communication type that is available, which may be referred to as a second communication type.

Accordingly, the voice control subsystem 229 may be configured to prioritize the contact specified in the voice command over the communication type specified. Where a voice command specifies a communication type that is unavailable, the voice control subsystem 229 may preserve information regarding the contact that was specified and may propose an alternative communication type for communicating with that contact. (I.e. it may not require the contact to be re-specified; it may identify an available communication type for communicating with contact earlier specified.)

The voice command may include information in addition to the communication type and the contact. For example, the voice command may specify content for the communication. The content may, in at least some example embodiments, specify a message body and/or a subject for the communication. As noted above, in some example embodiments, the voice control subsystem 229 may permit a voice command to be input that contains multiple types of information in a single sentence. Thus, a single sentence voice command may include a communication type, a contact, and/or content such as a message body and/or a subject.

When a voice command specifies the communication type and content in a single sentence and that requested communication type is not available, it is possible that the content may not conform to the alternative communication type that the electronic device 201 utilizes in lieu of the requested communication type. For example, while an email message may include a subject field which allows a subject to be specified, a text message, such as an SMS message, may not include an equivalent field. When content is specified in the voice command in a format that is incompatible with the alternative communication type, in at least some example embodiments, the content may be reformatted to be compatible with the requested communication type. For example, where a subject is specified in the voice command and the alternative communication type does not support the use of subjects, then the electronic device may include the subject in a message body field and may, in at least some example embodiments, include a subject identifier (e.g. "Subject:") in the message body field before the subject.

The functions and features of the voice control subsystem 229 will be described in greater detail below with reference to FIGS. 2 to 5.

In FIG. 1, the voice control subsystem 229 is illustrated as being provided by computer readable instructions associated with the main processor 240 of the electronic device 201. It will, however, be appreciated that the voice control techniques described herein may, in at least some example embodiments, be provided by other components. For example, in some example embodiments, a separate processor may be used to reduce processing power consumption at the main processor.

In at least some example embodiments, the operating system 222 may perform some or all of the functions of the contact manager 226 and/or the voice control subsystem 229. In other example embodiments, the functions or a portion of the functions of the contact manager 226 and/or the voice control subsystem 229 may be performed by one or more other applications. Further, while the contact manager 226 and the voice control subsystem 229 have been illustrated as single blocks, the contact manager 226 and/or the voice control subsystem 229 may include a plurality of software modules. In at least some example embodiments, these software modules may be divided among multiple applications.

Facilitating Communications Using an Alternative Communication Type

Reference will now be made to FIGS. 2 to 5 which illustrate methods 300, 400, 500, 600 for facilitating communications using an alternative communication type when a requested communication type is unavailable. The electronic device 201 (FIG. 1) may be configured to perform any one or more of the methods 300, 400, 500, 600 of FIGS. 2 to 5. In at least some example embodiments, the processor 240 of the electronic device 201 is configured to perform any one or more of the methods 300, 400, 500, 600 of FIGS. 2 to 5. One or more applications 224 (FIG. 1) or modules on the electronic device 201 (FIG. 1) may contain computer readable instructions which cause the processor 240 (FIG. 1) of the electronic device 201 to perform any one or more of the methods 300, 400, 500, 600 of FIGS. 2 to 5. In at least some example embodiments, the voice control subsystem 229 (FIG. 1) stored in memory of the electronic device 201 is configured to perform any one or more of the methods 300, 400, 500, 600 of FIGS. 2 to 5. More particularly, the voice control subsystem 229 may contain computer readable instructions which, when executed, cause the processor 240 to perform any one or more of the methods 300, 400, 500, 600 of FIGS. 2 to 5. It will be appreciated that any one or more of the methods 300, 400, 500, 600 of FIGS. 2 to 5 may, in at least some example embodiments, be provided by other software applications or modules or by other hardware apart from those specifically discussed above.

In at least some example embodiments, at least some of any one or more of the methods 300, 400, 500, 600 of FIGS. 2 to 5 may be performed by or may rely on other applications 224 or modules which interface with the voice control subsystem 229. For example, the contact manager 226 may be equipped with an application programming interface (API) and the voice control subsystem 229 may access features of the contact manager 226.

Figure 2:
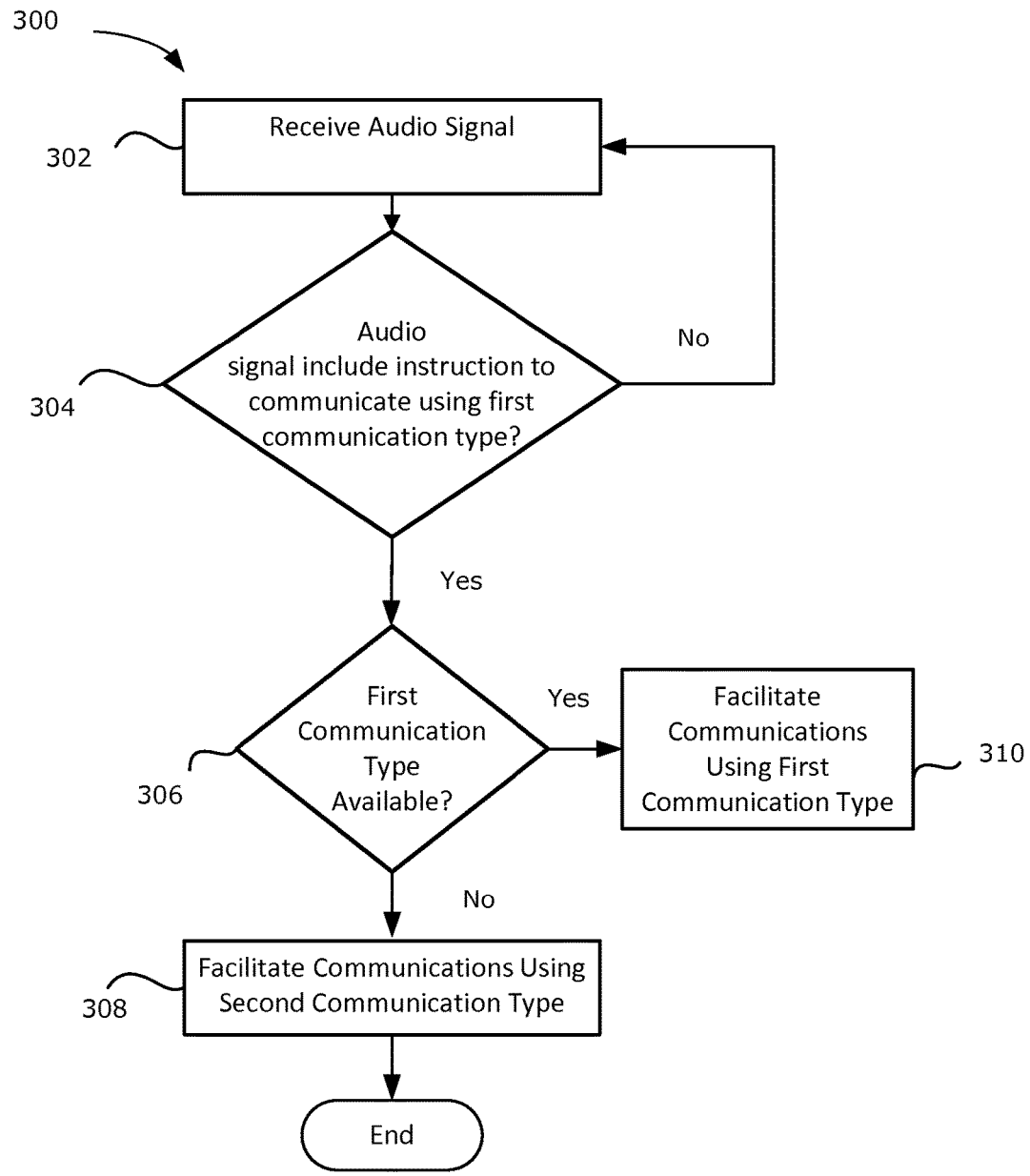
FIG. 2 is a flowchart illustrating an example method of facilitating communications using a second communication type when a first communication type is unavailable.

Referring first to FIG. 2, a flowchart illustrates a method 300 of facilitating communications using an alternative communication type when a requested communication type is unavailable. At 302, an audio signal is received at the electronic device 201. The audio signal is generated by the microphone 258 (FIG. 1) in dependence on sound waves in the vicinity of the electronic device 201. The audio signal may be output from the microphone 258 and input into a processor 240. In at least some example embodiments, signal processing techniques may be performed on the audio signal before or after it is input into the processor. For example, the audio signal may be passed through an amplifier, which amplifies the audio signal. In some example embodiments, the audio signal may be output from the microphone 258 as an analog audio signal and converted to a digital signal using an analog to digital converter before inputting the signal into the processor.

At 304, the electronic device 201 determines whether the audio signal includes a voice command to communicate with a contact using a specified communication type (the specified communication type may be referred to as a first communication type). More particularly, in at least some example embodiments, the audio signal may be passed through a speech recognition engine which converts the audio signal into text. This text may then be analyzed to determine whether the audio signal includes a voice command and if so, the nature of the voice command.

Thus, in at least some example embodiments, at 304, the electronic device 201 determines whether the audio signal includes a voice command that represents an instruction to communicate with a contact using a specific communication type (i.e. using a specific form of communication). The communication type may be, for example: email messaging, voice telephony, text messaging including SMS messaging and/or MMS messaging, instant messaging, PIN messaging, social network messaging and/or video chat.

Different key words or phrases included in the audio signal may be associated with different communication types. For example, the audio signal may be analyzed to determine whether it includes one or more key words or phrases that may be interpreted as an instruction to communicate using a telephony communication type. By way of example, this analysis may monitor for any one or more of the following words or phrases or other predetermined words or phrases considered to be indicative of a request to initiate a voice-based communication: "call", "phone", "dial", "telephone", "talk to", "chat with", and/or "voice".

Similarly, the audio signal may be analyzed to determine whether it includes one or more key words or phrases that may be interpreted as an instruction to communicate using a video chat service communication type. By way of example, this analysis may monitor for any one or more of the following words or phrases or other predetermined words or phrases considered to be indicative of a request to initiate a video chat: "Skype", "video chat", "video dial", "video call", and/or "video phone".

Similarly, the audio signal may be analyzed to determine whether it includes one or more key words or phrases that may be interpreted as an instruction to communicate using an email message communication type. By way of example, this analysis may monitor for any one or more of the following words or phrases or other predetermined words or phrases considered to be indicative of a request to compose an email: "email", "electronic mail", "email message", and/or "message".

Similarly, the audio signal may be analyzed to determine whether it includes one or more key words or phrases that may be interpreted as an instruction to communicate using a text message communication type. By way of example, this analysis may monitor for any one or more of the following words or phrases or other predetermined words or phrases considered to be indicative of a request to compose a text message: "text", "SMS" (which may be interpreted as a command to send a short messaging service text message), "MMS" (which may be interpreted as a command to send a multimedia messaging service text message), and/or "text message".

Similarly, the audio signal may be analyzed to determine whether it includes one or more key words or phrases that may be interpreted as an instruction to communicate using an instant message communication type. By way of example, this analysis may monitor for any one or more of the following words or phrases or other predetermined words or phrases considered to be indicative of a request to compose an instant message: "chat", "chat with", "IM", "instant message", "BBM" or "Blackberry message" or "BB message" (which may be interpreted as an instruction to communicate via a Blackberry Messenger™ service), "Yahoo message" or "Yahoo chat" (which may be interpreted as an instruction to communicate using a Yahoo Messaging™ service, and/or "Google message" or "Google chat" (which may be interpreted as an instruction to communication via a Google Chat™ service).

Similarly, the audio signal may be analyzed to determine whether it includes one or more key words or phrases that may be interpreted as an instruction to communicate using a device to device communication type. By way of example, this analysis may monitor for any one or more of the following words or phrases or other predetermined words or phrases considered to be indicative of a request to compose a device to device message: "PIN", "device-to-device", "D2D", "device to device", "device message" and/or "PIN message."

Similarly, the audio signal may be analyzed to determine whether it includes one or more key words or phrases that may be interpreted as an instruction to communicate using a social network based communication type. By way of example, this analysis may monitor for any one or more of the following words or phrases or other predetermined words or phrases considered to be indicative of a request to compose a social network based communication: "Facebook™" or "Facebook message" or "Facebook post" (which may be interpreted as an instruction to communicate using Facebook™ e.g. by sending a Facebook message or by posting on a wall), "Google plus" or "Google plus message" (which may be interpreted as an instruction to communicate using Google™), "Tweet to" or "Twitter to" (which may be interpreted as an instruction to communicate using Twitter™).

The electronic device 201 may monitor for instructions to communicate using other communication types not specifically listed above and may monitor for key words or phrases not specifically listed above or for other features in the audio signal not specifically discussed above.

Thus, if the audio signal includes an instruction to communicate with a contact using a specific communication type, then at 304 the electronic device 201 identifies the specific communication type that is requested. This communication type may be referred to as the requested communication type or the first communication type.

At 304, the electronic device also analyzes the audio signal to identify the contact associated with the communication. For example, the electronic device may monitor for the inclusion of an identification of a contact in the audio signal. In at least some example embodiments, the electronic device may monitor for the inclusion of an identification of a contact included in the audio signal immediately following the communication type. For example, the audio signal may contain the communication type and an identification of the contact in a single sentence. Thus, when a communication type is received in an audio signal, the electronic device may monitor the next word(s) contained in that audio signal and may determine whether the next word(s) identify a contact. This determination may be made, for example, by comparing content contained in the audio signal to contact records 292 accessible by the electronic device 201. For example, the electronic device 201 may compare the content in the audio signal to a name field of the contact records 292 to identify a contact associated with the communication.

Accordingly, in some example embodiments, at 304 the electronic device may identify that a request to communicate has been received, may identify the communication type associated with that request, and may also identify the contact associated with that request.

Thus, in at least some example embodiments, at 304 the electronic device 201 may determine that the audio signal includes a voice command to communicate with a contact using a first communication type (i.e. a requested communication type).

If the audio signal includes a voice command to communicate with a contact using a first communication type (i.e. a requested communication type), then at 306, the electronic device 201 may determine whether the first communication type (i.e. the communication type that was requested), is available. This determination may, in at least some example embodiments, be made based on the contents of the contact record for the specified contact. For example, the electronic device 201 may consult the contact record 292 for the contact and may determine that communication with the contact using the first communication type is unavailable if it determines that a contact record associated with the contact does not include contact information associated with the first communication type. For example, if an email communication type has been requested and the contact record 292 (FIG. 1) for the requested contact does not include an email address, then the electronic device 201 determines that the first communication type is unavailable.

In some example embodiments, the determination of whether the first communication type (i.e. the requested communication type) is available may be made based on a current network connectivity status. As noted in the discussion of FIG. 1 above, in some example embodiments, the electronic device 201 may include a wireless communications subsystem 211 that allows the electronic device to communicate with wireless networks 101 of different types. Some of the types of networks may support both voice based communications (such as telephony and/or text messaging) and data based communications (such as email and communications requiring Internet-based services) and some of the types of networks may support only voice based communications (i.e. some networks may not provide a data connection) and some of the types of networks (such as Wi-Fi in some example embodiments) may only support data based communications (i.e. some networks may not support telephony or text messaging communications that rely on a telephony network). In some circumstances, a voice command may instruct the electronic device 201 to communicate with a contact using a communication type that is not supported due to the current network connectivity status (i.e. since the available network(s) may not support that type of communication). In at least some example embodiments, at 306, the electronic device may determine that communication with the contact using the first communication is unavailable if it determines that communication using the first communication type is currently unavailable based on a current network connectivity status (e.g. if it determines that the available networks do not support the requested communication type).

In some example embodiments, at 306, the electronic device 201 may determine whether a service outage is preventing communication with the contact using the requested communication type. As noted above, a communication type may become unavailable due to a server outage, for example. For example, an online service may be used for some communication types to communicate and that service may, in some instances, go offline. By way of example, social network based communications, such as Facebook™, Google+™, or Twitter™ communications, may rely on online servers to send such communications. In at least some example embodiments, at 306 the electronic device may determine that the first communication type is unavailable if it has been affected by an outage.

If the electronic device 201 determines that communication with the contact using the first communication type (i.e. the communication type that was requested) is available, then at 310 the electronic device may facilitate communication with the contact using the first communication type. For example, the electronic device may initiate a communication to the contact using the first communication type. For example, where the first communication type is a message, such as an email message, then a message composition interface of that communication type may be opened and address information may be automatically populated using address information in the contact record for the selected contact. Similarly, where the first communication type is telephony, then a voice call may be made to the contact using a phone number obtained from the contact record for that contact.

If, however, the electronic device 201 determines that communication with the contact using the first communication type is unavailable, then at 308, the electronic device facilitates communication with a contact using a communication of another communication type, which may be referred to as a second communication type.

More particularly, the electronic device may, at 308 identify another communication type that is available for communication with that contact. (I.e. it may identify a communication type different than the first communication type that is available.) Thus, in at least some example embodiments, the electronic device may determine at 308 that communication with the contact using the second communication type is available.

For example, if the electronic device determined (at 306) that the first communication type was not available, since contact information associated with that communication type was not included in the contact record for the selected contact, then at 308 the electronic device may identify another communication type for which the contact record includes contact information.

Similarly, if at 306 the electronic device determined that the first communication type was not available based on the current network connectivity status, then at 308 the electronic device may identify an alternative communication type that is available based on the current network connectivity status. Accordingly, at 308, the electronic device may determine that communication using the second communication type is currently available based on the current network connectivity status. For example, if the first communication type is a communication type that is configured for transmitting messages over a data connection (such as, for example, an email messaging communication type, a social network based communication type, etc.), and if at 306, the electronic device determined that the first communication type is unavailable since a data connection is unavailable, then at 308, the electronic device 201 may select a communication type that does not require the data connection. For example, the electronic device may select a short messaging service (SMS) communication type or a telephony communication type.

After the second communication type is selected, at 308, the electronic device 201 may facilitate communication with the contact using the second communication type by prompting a user to confirm that they would like to communicate with the contact using the second communication type. For example, a prompt for confirmation may be displayed on a display associated with the electronic device and/or an audible prompt may be output through a speaker associated with an electronic device (e.g. "no email address is available for that contact, would you like to send a text instead?"). In at least some example embodiments, the prompt may be automatically generated after determining that communication with the second communication type are available.

After generating the prompt, the electronic device 201 may monitor for input confirming that the user would like to proceed to communicate with the contact using the second communication type. Such input may be received, for example, as an audio signal For example, in response to a prompt, such as "no email address is available for that contact, would you like to send a text instead?", a user may audibly respond with a "yes" to confirm.

After receiving confirmation to communicate with the contact using the second communication type, the electronic device may initiate a communication to the contact using the second communication type and may transmit the communication in accordance with the second communication type to the contact. For example, where the second communication type is a message, such as an email message, then a message composition interface of that communication type may be opened and address information may be automatically populated using address information in the contact record for the selected contact. Similarly, where the second communication type is telephony, then a voice call may be made to the contact using a phone number obtained from the contact record for that contact.

As noted above in the discussion of FIG. 1, in some instances, a voice command may specify content that is to be included in a communication. As noted previously, when a voice command specifies the communication type and content in a single sentence and that requested communication type is not available, it is possible that the content may not conform to the alternative communication type that the electronic device 201 utilizes in lieu of the requested communication type. Accordingly, in at least some example embodiments, content may be reformatted when a requested communication type is unavailable.

Figure 3:
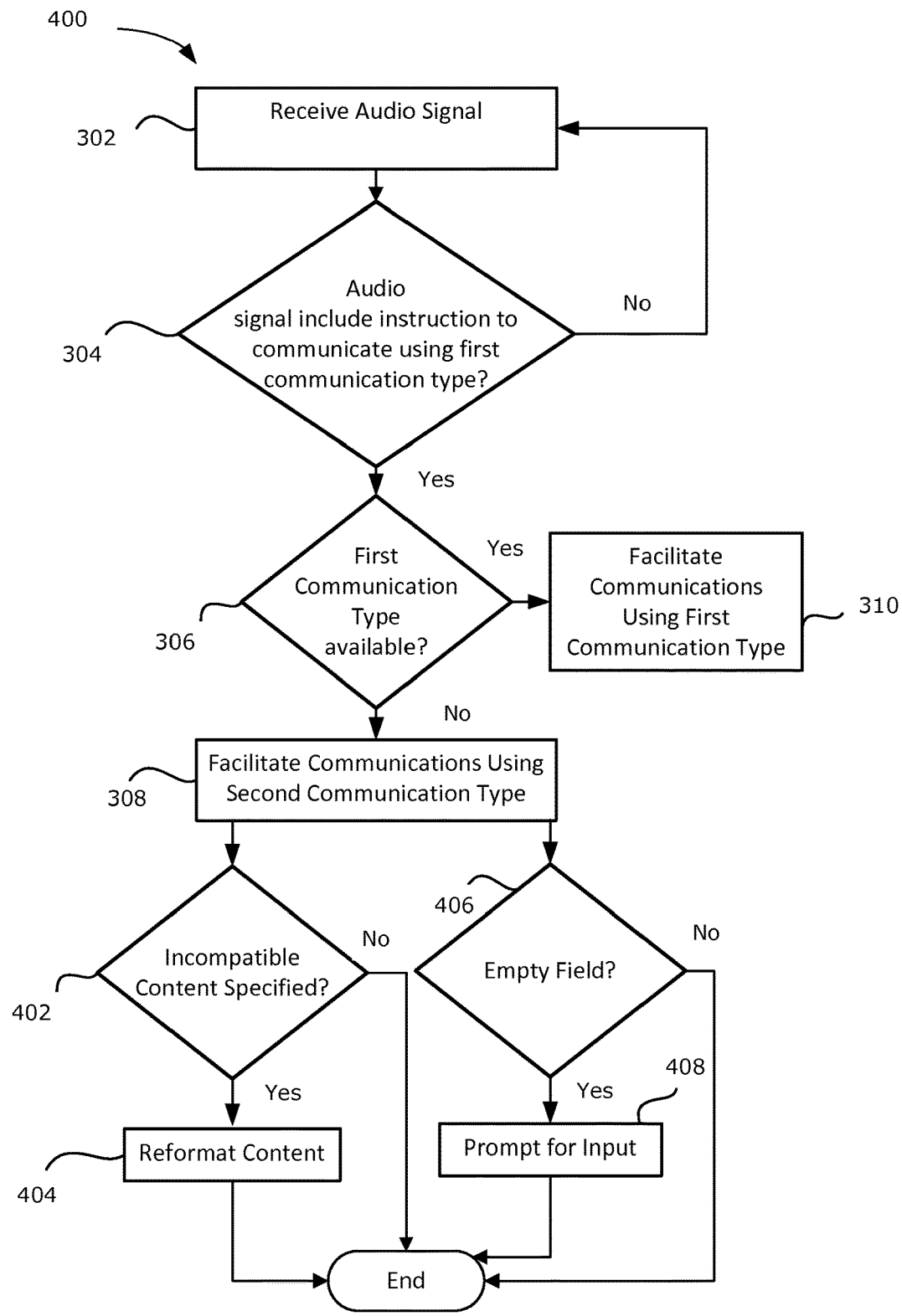
FIG. 3 is a flowchart illustrating a further example method of facilitating communications using a second communication type when a first communication type is unavailable.

Referring now to FIG. 3, one such example embodiment is illustrated. FIG. 3 illustrates a flowchart of an example method 400. The method 400 includes some functions and features described above with reference to FIG. 2, the discussion of which will not be repeated.

As illustrated, in at least some examples, if it is determined that the first communication type is not available (at 306), then at 402 the electronic device 201 may determine whether content has been specified that is incompatible with the second communication type. If the content is incompatible, then at 404, the content may be reformatted into a format that is compatible with the second communication type.

For example, in some circumstances, the first communication type may be configured to provide a communication having multiple fields and the second communication type may be configured to provide a communication having a single field. In such circumstances, if the voice command specifies content associated with a plurality of fields, then the electronic device 201 may reformat the content (at 404) by combining the content associated with the plurality of fields together (e.g. by concatenating such content) and including the combined content in the single field provided by the second communication type.

For example, the first communication type may be configured to permit a subject to be included in a subject field and the second communication type may not permit a subject to be included in a subject field. By way of example, while an email message may include a subject field which allows a subject to be specified, a text message, such as an SMS message, may not include an equivalent field. Thus, in at least some example embodiments, at 402 the electronic device determines if the voice command includes content associated with a subject field. This determination may be made, for example, by monitoring for a subject field trigger in the audio signal. The subject field trigger may, for example, be the word "subject" and the content associated with the subject field may be the word or phrase following the subject field trigger (e.g. for the phrase "email bill subject hello", the subject field trigger is "subject" and the content associated with the subject field is "hello"). After the content associated with the subject field is identified, it may be included in a message body field associated with the second communication type.

For example, where a subject is specified in the voice command and the alternative communication type does not support the use of subjects, then the electronic device may include the subject in a message body field and may, in at least some example embodiments, include a subject identifier (e.g. "Subject:") in the message body field before the subject.

In at least some example embodiments, the content associated with the subject field may be included in the message body field together with content that was contained in the voice command and that is associated with a message body field. For example, the voice command may specify both a subject and a message body. The content associated with the message body field may, for example, be identified by monitoring for a message body trigger such as the word "message" in the audio signal and the electronic device 201 may determine that the word or set of words following the message body trigger represents the content associated with the message body field (e.g. for the phrase "email bill subject hello message just wanted to say hi", the message body trigger is "message" and the content associated with the message body field is "just wanted to say hi"). Where content associated with the message body field and content associated with the subject field are both specified in the voice command and the second communication type only supports a single field (which may be referred to as a message body field), both of these types of content may be included in that field. To allow a user to differentiate between the content that represents the subject and the content that represents the message body, one or more content identifiers may also be included in the message body field. For example, a message body identifier may be included in the message body field before the content associated with the message body field. In some example embodiments, a subject identifier may be included in the message body field before the content associated with the subject field. For example, the message body field may be populated with a phrase such as "Subject: hello, Message: just wanted to say hi". In this example "Subject:" acts as a subject identifier and "Message:" acts as a message body identifier.

While the example above illustrated a reformatting of content associated with two fields (e.g. a message body field and a subject field) into a single field (e.g. a message body field), in other example embodiments, content for a different number of fields may be reformatted. For example, in at least some embodiments, content may be defined (e.g. may be included in voice command) for a number of fields, n. In some examples, this number of fields, n, may be greater than the number of fields, m, that are provided by the second communication type. For example, in some circumstances, content may be defined for three fields but the second communication type may only allow for two fields. In some such examples, the electronic device 201 may include content defined for one of the three fields in a single field associated with the second communication type (e.g. content defined for a message body field may be included in a message body field provided by the second communication type) and may combine the content defined for the other two fields into the other field provided by the second communication type (e.g. content defined for a title field and a message body field may be included in a title field provided by the second communication type).

Thus, in at least some examples, the first communication type may be configured to provide a communication having a different number of fields than the second communication type and, when the voice command includes content associated with a greater number of fields than the second communication type allows, the electronic device 201 may combine content associated with one or more of those fields for inclusion in a single one of the fields provided by the second communication type.

In some circumstances, a first communication type (i.e. the requested communication type) may be configured to provide a communication having a single field and the second communication type (i.e. the alternative communication type) may be configured to provide a communication having multiple fields. When this happens, the voice command may include content associated with only a single field. The electronic device may include this content in one of the multiple fields provided by the second communication type. For example, in at least some example embodiments, this content may be included in a message body field.

In at least some example embodiments, at 406, the electronic device 201 may determine whether the second communication type includes one or more fields that a user may wish to populate but for which no content has yet been specified; for example, a subject field. That is, the electronic device identifies empty fields associated with the second communication type. The electronic device may then prompt the user for input of content associated with that field at 408. For example, in at least some examples, the electronic device prompts for input of content associated with a subject field.

A prompt may be used, in at least some examples, when a voice command included content associated with a lesser number of fields than the second communication type allows. For example, in some examples, the first communication type may be configured to provide a communication having a different number of fields than the second communication type. When a user requests use of the first communication type, they may only define content for the fields associated with the first communication type. Thus, in some circumstances, content may not be defined for at least some of the fields provided by the second communication type. In such circumstances, the electronic device may prompt for input of content associated with one of the fields associated with the second communication type. More particularly, the content that is defined for fields of the first communication type may be mapped to similar or equivalent fields of the second communication type and a prompt may be generated to request input of content associated with fields of the second communication type for which content has not yet been defined.

In some circumstances, the first communication type and the second communication type may provide for the same number of fields. In such circumstances, content defined for the first communication type may be mapped to fields associated with the second communication type using a direct one to one ratio. That is, in such circumstances, the separation of content into different fields provided by the first communication type is maintained when such content is included in the second communication type.

Figure 4:
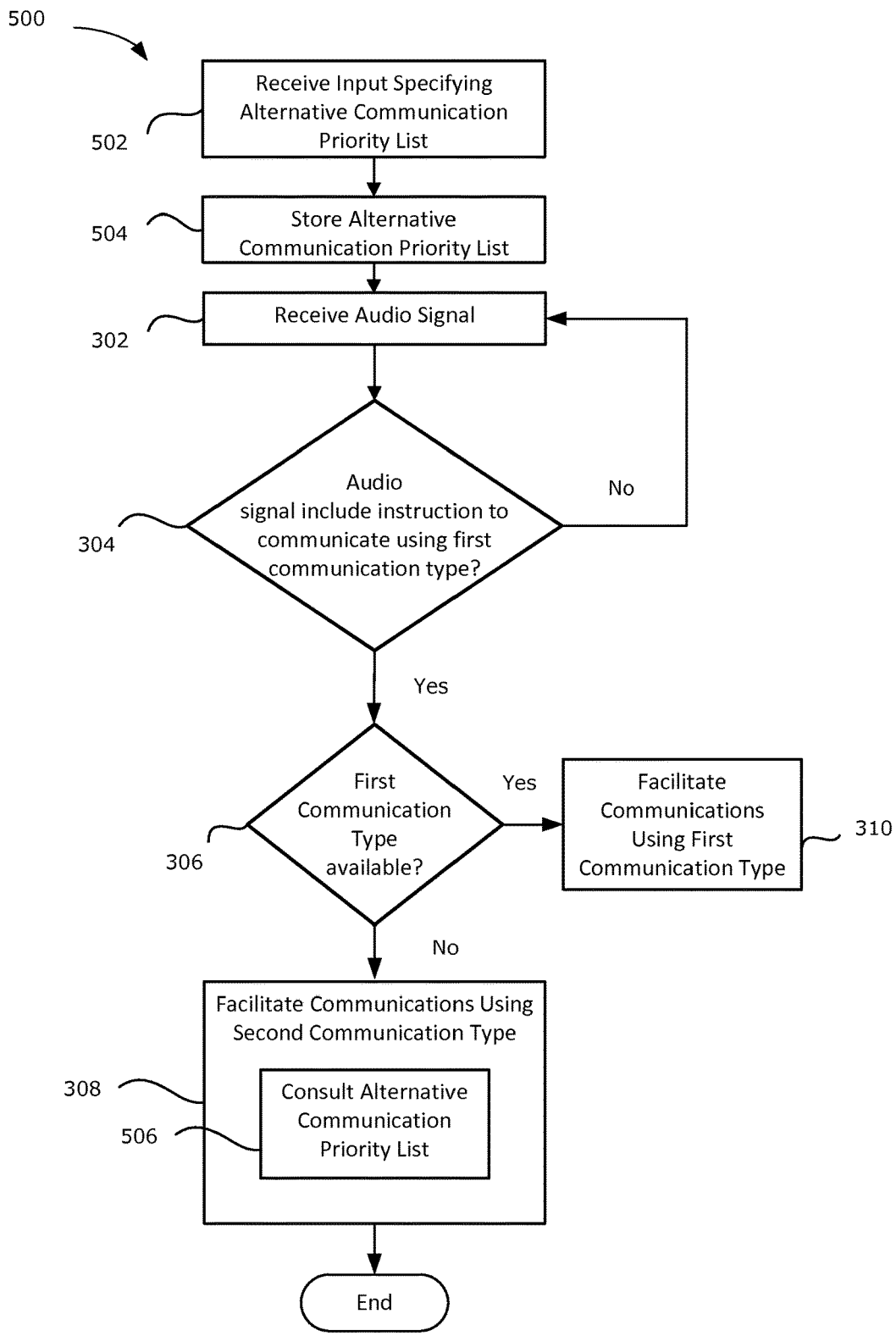
FIG. 4 is a flowchart illustrating a further example method of facilitating communications using a second communication type when a first communication type is unavailable.
Figure 5:
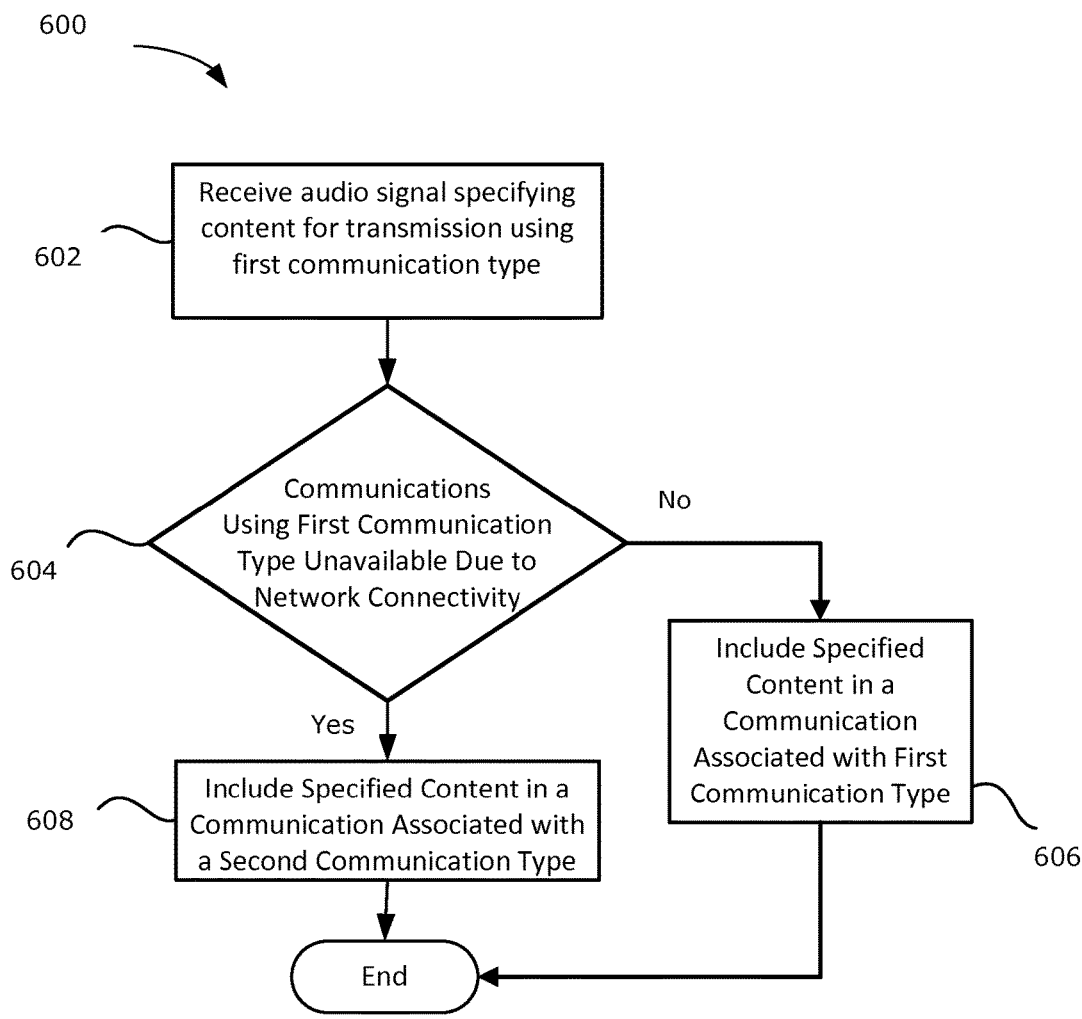
FIG. 5 is a flowchart illustrating a further example method of facilitating communications using a second communication type when a first communication type is unavailable.

The selection of an alternative communication type to use when a requested communication type is unavailable may, in at least some example embodiments, be performed in accordance with user preferences. Referring now to FIG. 4, an example of one such example is illustrated. FIG. 4 illustrates a flowchart of an example method 500. The method 500 includes some functions and features described above with reference to FIG. 2, the discussion of which will not be repeated.

At 502, user input in received configuring an alternate communication type prioritization list associated with the first communication type. In some example embodiments, each communication type supported by the electronic device may be associated with a separate communication type prioritization list. This list indicates the order of selection for alternative communication types when a requested communication type is unavailable. For example, an alternate communication type prioritization list associated with an email communication type may specify that, if email is unavailable, then text messaging should be used and if text messaging is unavailable then a voice-based communications should be used.

The alternate communication type prioritization list may be stored at 504 in memory of the electronic device 201. Then, at 506, the alternate communication type prioritization list associated with the first communication type is used to identify a highest priority alternative communication type that is currently available. That is, the alternative communication type prioritization list is consulted to identify an alternative communication type to use when a requested communication type is unavailable.

In other example embodiments, when multiple alternative communication types are available, the electronic device may allow the user to select which of these alternative communication types are to be used. For example, the electronic device may prompt a user to select one of a plurality of communication types for which communication with the contact are available.

While the methods 300, 400, 500 discussed above have generally referred to methods where an alternative communication method is selected after a contact has been specified, it will be appreciated that some of the techniques described herein may be performed even when a contact has not yet been specified. For example, where an instruction to communicate using a specific communication type is received at the electronic device and, due to a network connectivity status that communication type is unavailable, the electronic device may facilitate communication using another communication type.

Referring now to FIG. 6, one such example is illustrated. FIG. 6 illustrates a flowchart of a method 600 for facilitating communications.

At 602, an audio signal is received that includes a voice command instructing that specified content be transmitted according to a first communication type.

Then at 604, the electronic device determines if communication using the first communication type is currently available based on a current network connectivity status. If such communication is available, then at 606 the electronic device includes the specified content in a communication associated with the first communication type. If, however, such communication is not available, then at 608 the electronic device includes the specified content in a communication associated with a second communication type.

While the present application is primarily described in terms of methods, a person of ordinary skill in the art will understand that the present application is also directed to various apparatus such as an electronic device 201 including a mobile communications device. The electronic device 201 includes components for performing at least some of the example embodiments and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method comprising:
receiving an audio signal at an electronic device via a microphone of the electronic device;
converting the audio signal to text using a speech recognition engine;
determining, based on an analysis of the text, that the audio signal includes a voice command to communicate with a contact using a first communication type;
determining, by the electronic device, a current network connectivity status indicating wireless networks that are currently available for the electronic device to communicate over wirelessly using a wireless communications subsystem of the electronic device adapted to communicate wirelessly with wireless networks of different types by receiving and transmitting radio frequency signals;

after receiving the audio signal, determining, by the electronic device based on the current network connectivity status, that communication with the contact using the first communication type is unavailable as the first communication type is not a supported communication type of any of the wireless networks that are currently available for the electronic device to communicate over wirelessly using the wireless communications subsystem; and after determining that communication with the contact using the first communication type is unavailable, automatically facilitating communication with the contact using a second communication type by:
  determining, by the electronic device based on the current network connectivity status, that the second communication type is a supported communication type of at least one of the wireless networks that are currently available for the electronic device to communicate over wirelessly using the wireless communications subsystem;
  after determining that the second communication type is a supported communication type of at least one of the wireless networks that are currently available for the electronic device to communicate over wirelessly using the wireless communications subsystem, prompting, by the electronic device, for confirmation to communicate with the contact using the second communication type; and
  after receiving confirmation to communicate with the contact using the second communication type, transmitting, by the electronic device, a communication to the contact in accordance with the second communication type.

2. The method of claim 1, wherein the first communication type is configured for transmitting messages over a data connection, and wherein determining that the first communication type is not a supported communication type of any of the different types of wireless networks that are currently available via the wireless communications subsystem includes determining that none of the different types of wireless networks that are currently available for communication over using the wireless communications subsystem provides a data connection, and wherein the second communication type is a communication type that does not require the data connection.

3. The method of claim 2, wherein the first communication type is an email protocol and the second communication type is a short messaging service (SMS) communication type.

4. The method of claim 2, wherein the first communication type is an email protocol and the second communication type is a telephony communication type.

5. The method of claim 1, wherein facilitating communication with the contact using a second communication type further includes:
  consulting an alternate communication type prioritization list associated with the first communication type to identify a highest priority alternative communication type that is currently available.

6. The method of claim 5, further comprising, prior to consulting the alternate communication type prioritization list:
  receiving user input configuring the alternate communication type prioritization list associated with the first communication type; and
  storing the alternate communication type prioritization list in memory.

7. The method of claim 1, wherein facilitating communication with the contact using a second communication type further includes:
  prompting for selecting of one of a plurality of communication types for which communication with the contact is available, the plurality of communication types including the second communication type.

8. The method of claim 1, wherein the voice command includes a subject field trigger and content associated with a subject field, and wherein the first communication type is configured to permit a subject to be included in a subject field and the second communication type does not permit a subject to be included in a subject field, the method further comprising:
  including the content associated with the subject field in a message body field associated with the second communication type.

9. The method of claim 8, wherein the voice command further includes a message body field trigger and content associated with a message body field, the method further comprising:
  including the content associated with the message body field in the message body field.

10. The method of claim 9, further comprising:
  including a message body identifier in the message body field before the content associated with the message body field.

11. The method of claim 8, further comprising:
  including a subject identifier in the message body field before the content associated with the subject field.

12. The method of claim 1, wherein the first communication type is configured to provide communication having multiple fields and the second communication type is configured to provide communication having a single field and wherein the voice command includes content associated with a plurality of fields, the method further comprising:
  combining the content associated with the plurality of fields; and
  including the combined content in the single field provided by the second communication type.

13. The method of claim 1, wherein the first communication type is configured to provide a communication having a single field and the second communication type is configured to provide a communication having multiple fields and wherein the voice command includes content associated with the single field, the method further comprising:
  including the content associated with the single field in one of the multiple fields provided by the second communication type.

14. The method of claim 1, wherein the first communication type is configured to provide a communication having a different number of fields than the second communication type, the method comprising:
  when the voice command includes content associated with a greater number of fields than the second communication type allows, combining content associated with one or more of those fields for inclusion in a single one of the fields provided by the second communication type.

15. The method of claim 14, further comprising:
  when the voice command includes content associated with a lesser number of fields than the second communication type allows, prompting for input of content associated with one of the fields associated with the second communication type.

16. An electronic device comprising:
  a microphone for generating an audio signal;

at least one wireless communications subsystem for communicating wirelessly with wireless networks of different types using a first communication type and a second communication type by receiving and transmitting radio frequency signals; and a processor configured to:

receive an audio signal from the microphone;

convert the audio signal to text using a speech recognition engine;

determine, based on an analysis of the text, that the audio signal includes a voice command to communicate with a contact using a first communication type;

determine, by the electronic device, a current network connectivity status indicating wireless networks that are currently available for the electronic device to communicate over wirelessly using the wireless communications subsystem;

after receiving the audio signal, determine, by the electronic device based on the current network connectivity status, that communication with the contact using the first communication type is unavailable as the first communication type is not a supported communication type of any of the wireless networks that are currently for the electronic device to communicate over wirelessly using the wireless communications subsystem; and after determining that communication with the contact using the first communication type is unavailable, automatically facilitate communication with the contact using a second communication type by:

determining, by the electronic device based on the current network connectivity status, that the second communication type is a supported communication type of at least one of the wireless networks that are currently available to communicate over wirelessly using the wireless communications subsystem;

after determining that the second communication type is a supported communication type of at least one of the wireless networks that are currently available to communicate over wirelessly using the wireless communications subsystem, prompting, by the electronic device, for confirmation to communicate with the contact using the second communication type; and after receiving confirmation to communicate with the contact using the second communication type, transmitting, by the electronic device, a communication to the contact in accordance with the second communication type.

17. The electronic device of claim 16, wherein the first communication type is configured for transmitting messages over a data connection, and wherein determining that the first communication type is not a supported communication type of any of the different types of wireless networks that are currently available via the wireless communications subsystem includes determining that none of the different types of wireless networks that are currently available to communicate over wirelessly using the wireless communications subsystem provides a data connection, and wherein the second communication type is a communication type that does not require the data connection.

18. The electronic device of claim 16, wherein the processor is further configured to, in order to facilitate communication with the contact using the second communication type:

consult an alternate communication type prioritization list associated with the first communication type to identify a highest priority alternative communication type that is currently available.

19. A processor-implemented method comprising:

receiving, at an electronic device via a microphone, an audio signal including a voice command instructing that specified content be transmitted according to a first communication type wherein the command is identified using a speech recognition engine;

determining, by the electronic device, a current network connectivity status indicating wireless networks that are currently available for the electronic device to communicate over wireless using a wireless communications subsystem of the electronic device adapted to communicate wirelessly with wireless networks of different types by receiving and transmitting radio frequency signals;

determining, by the electronic device based on the current network connectivity status, that communication with the contact using the first communication type is unavailable as the first communication type is not a supported communication type of any of the wireless networks that are currently available for the electronic device to communicate over wirelessly using the wireless communications subsystem; and after determining that communication using the first communication type is currently unavailable:

determining, by the electronic device based on the current network connectivity status, that a second communication type is a supported communication type of at least one of the wireless networks that are currently available to communicate over wirelessly using the wireless communications subsystem; and including the specified content in a communication associated with the second communication type.

20. The method of claim 19 wherein the voice command further instructs that the specific content is to be transmitted to a contact and wherein determining, by the electronic device, that communication using the first communication type is currently unavailable further comprises determining that a contact record associated with the contact includes contact information associated with the first communication type before determining, based on the current network connectivity status, that the first communication type is not a supported communication type of any of the different types of wireless networks that are currently available to communicate over wirelessly using the wireless communications subsystem.

* * * * *